(12) United States Patent
Patwardhan et al.

(10) Patent No.: US 9,026,548 B2
(45) Date of Patent: May 5, 2015

(54) DATABASE SAMPLING

(75) Inventors: Nikhil Patwardhan, Pune (IN); Sumit Johri, Pune (IN); Amol Limaye, Pune (IN); Ashim Roy, Pune (IN); Rupali Kulkarni, Pune (IN); Sachin Lodha, Pune (IN)

(73) Assignee: Tata Consultancy Services Limited, Mumbai, Maharashtra (IN)

( * ) Notice: Subject to any disclaimer, the term of this patent is extended or adjusted under 35 U.S.C. 154(b) by 175 days.

(21) Appl. No.: 13/406,464

(22) Filed: Feb. 27, 2012

(65) Prior Publication Data
US 2012/0330900 A1   Dec. 27, 2012

(30) Foreign Application Priority Data
Jun. 27, 2011   (IN) .......................... 1847/MUM/2011

(51) Int. Cl.
*G06F 17/30* (2006.01)
(52) U.S. Cl.
CPC .... *G06F 17/30536* (2013.01); *G06F 17/30563* (2013.01)
(58) Field of Classification Search
CPC ................................................ G06F 17/30536
USPC ................................................. 707/773, 769
See application file for complete search history.

(56) References Cited

U.S. PATENT DOCUMENTS

| 7,146,370 | B1 * | 12/2006 | Klindt et al. .................. 707/773 |
| 7,487,168 | B2 * | 2/2009 | Rys et al. .............................. 1/1 |
| 8,131,727 | B2 * | 3/2012 | Berg et al. ..................... 707/741 |
| 2008/0114801 | A1 * | 5/2008 | Singh ............................ 707/102 |

OTHER PUBLICATIONS

Christallize Ltd., SelExl—Getting the right test data, Published in the year 2004.
Grid-Tools. Data Subset™—create smaller versions of production databases (2010).
Raj Kamal, Preetha Kumar, and Anandam Sarcar, Intelligent selection of test data by applying learning from Marketing Research (2012).
Jesus Bisbal, Database Sampling to Support the Development of Data-Intensive Applications, Published on Oct. 8, 2000.

* cited by examiner

*Primary Examiner* — William Spieler
(74) *Attorney, Agent, or Firm* — Blakely, Sokoloff, Taylor & Zafman LLP (57) ABSTRACT

The present subject matter relates to systems and methods for database sampling. The method comprises identifying at least one query table and one or more associated tables amongst a plurality of tables in a production database, based on filtering criteria. Further, the method comprises generating a key value list for the at least one query table and each of the one or more associated tables based on an order indicated by an order list. Based on the generated key value list, the sample data is extracted in a reverse order indicated by the order list, from the at least one query table and each of the one or more associated tables.

19 Claims, 5 Drawing Sheets

DATABASE SAMPLING

TECHNICAL FIELD

The present subject matter relates, in general, to relational database and, in particular, to a system and a method for database sampling.

BACKGROUND

Test data for testing an application may be obtained by creating a copy or clone of production data or generating synthetic data. The testing of the application using the production data is typically considered as reliable, as the production data corresponds to actual operational data. Such testing using the production data is known as data driven testing. Further, it is easier to create a copy of the production data than generating synthetic data, which is new data all together. However, copying the entire production data and keeping it in different test environments may lead to increased space requirements.

Generally, functional testing of an application is performed for certain selective test cases, and thus such a testing requires the production data corresponding to only those test cases. Therefore, using the entire production data, where only a portion of the production data is required may consume more time and resources in testing the application. Further, keeping the entire production data in the test environment may also lead to increased space requirement. Accordingly, in such cases, to reduce computational resources and time, functional testing of the application is performed using a portion of the production data. The process of extraction of the portion or subset of the production data from the production database is known as database sampling.

SUMMARY

This summary is provided to introduce concepts related to database sampling. These concepts are further described below in the detailed description. This summary is not intended to identify essential features of the claimed subject matter nor is it intended for use in determining or limiting the scope of the claimed subject matter.

Systems and methods for database sampling are described. The method comprises identifying at least one query table and one or more associated tables amongst a plurality of tables in a production database, based on filtering criteria. Further, the method comprises generating a key value list for the at least one query table and each of the one or more associated tables based on an order indicated by an order list. Based on the generated key value list, the sample data is extracted in a reverse order indicated by the order list, from the at least one query table and each of the one or more associated tables.

BRIEF DESCRIPTION OF THE DRAWINGS

The detailed description is provided with reference to the accompanying figures. In the figures, the left-most digit(s) of a reference number identifies the figure in which the reference number first appears. The same numbers are used throughout the drawings to reference like features and components.

DETAILED DESCRIPTION

Conventional techniques for retrieving sample data, which is a portion of the production data, from a production database involve random extraction of the sample data from the production database. However, random extraction of the sample data from the production database may not preserve the semantics of the production database, i.e., the extracted sample data may not satisfy various integrity constraints and dependencies. Further, manually extracting the sample data, which is semantically correct and satisfies all the integrity constraints, is often not feasible.

Certain conventional techniques extract the sample data that is semantically correct. However, such conventional techniques traverse different tables in the production database iteratively to extract the sample data, which is semantically correct. In certain cases the number of iterations may be large, for example, more than two for extracting semantically correct sample data from the production database. The extraction using multiple iterations may consume more computational resources and time. Further, the conventional techniques include execution of various complex queries formulated in Structured Query Language (SOL) to extract the test data, thereby making the process of database sampling complex.

In accordance with the preset subject matter, systems and methods for database sampling are described. The systems and methods extract a semantically correct portion of the production data from the production database. The portion of the production data so extracted may be referred to as sample data. The extraction of the sample data as described herein is efficient in terms of time and resource consumption.

In an implementation, a user may specify filtering criteria. The filtering criteria may include one or more filter queries and/or sampling percentages for database sampling. For example, the filter query may be in form of a simple 'Select' query formulated in Structured Query Language (SQL) for selecting the required portion of data from the production database. Further, the sampling percentage may be indicative of a percentage of production data required to be sampled for testing an application. For example, users may need only 20% of the production data. The 20% can therefore be specified as sampling percentage.

The production database includes data, for example, in the form of a plurality of tables. An order list of the plurality of tables may be created. In one implementation, the order list is created by listing the tables in parent first-child next manner. For example, considering table A and table B as two tables in the production database, wherein table B is a parent table and table A is a child table; the order list in such a case is created by listing table B higher in the order list than table A. In another implementation, the order list is created by listing the tables in child first-parent next manner. Referring to same example mentioned above, the order list is created by listing table A higher in the order list than table B.

Subsequent to the creation of the order list, the tables in the production database are read and recursive association or the tables, if any, is identified. For example, a recursive association can be a cyclic dependency between two tables.

If one or more recursive associations are found, such recursive associations are resolved. In an implementation, such recursive associations are resolved by creating key value lists for tables exhibiting a recursive association. The tables exhibiting recursive association are hereinafter referred to as recursive tables. The key value list for a table may be understood as a list containing a set of values from a key column of the table. The key column may be, for example, a primary key column or a foreign key column of the table. The primary key column may be understood as a column containing values that uniquely identify each row in the table, and the foreign key column may be understood as a column in a table that refers to a corresponding primary key column in another table. The creation of the key value lists for the recursive tables involves execution of a simple 'Select' SOL query for selecting distinct foreign key values for each recursive table. In an example, if table A and table B are recursive tables, recursion between table A and table B are resolved by creating the key value lists for both table A and table B. In said example, the key value list for table A is created by executing SQL query: Select distinct <foreign key column name> from table B, and the key value list for table B is created by executing SQL query: Select distinct <foreign key column name> from table A.

Subsequent to the creation of a key value list for each of the recursive tables, the tables in the production database are traversed in an order indicated by the order list and then in a reverse order indicated by the order list, for extraction of the sample data. In one embodiment, the order is a parent first-child next order, and the reverse order is a child first-parent next order, if the order list is created by listing the parent tables higher in the order than the child tables. In another embodiment, the order is the child first-parent next order and the reverse order is the parent first-child next order, if the order list is created by listing the child tables higher in the order than the parent table.

The extraction of the sample data, i.e., the database sampling in accordance with the present subject matter is carried out in two iterations, i.e., traversing the tables in an order indicated by the order list in the production database, i.e., in a top-to-bottom order (also referred as top-to-bottom iteration) and then in a reverse order, i.e., in a bottom-to-top order (also referred as bottom-to-up iteration). During the top-to-bottom iteration, the key value lists for the tables is created, and during bottom-to-top iteration, sample data form the tables are extracted based on the corresponding key value list. The sample data extracted from a table may be stored in form of a sample file or a sample table.

In an implementation, while traversing the tables in top-to-bottom iteration, one or more tables on which the filtering criteria, such as the filter query has been applied (hereinafter referred as query tables), and the tables that are associated with the query tables (hereinafter referred as associated tables) are identified. Upon identification, a key value list for each of the query tables and associated tables is created in an order indicated by the order list, if the key value list has not been created previously. For example, for the tables exhibiting recursive association, the key value lists are already created, therefore, such tables are skipped and no key value lists are created for these tables. The associated tables referred herein may include tables that are directly associated with the query table and the tables that are indirectly associated with the query table. The directly associated tables may be the tables that are referring to or are referred by the query table, while the indirectly associated tables may be a chain of tables, where at least one table from among the chain of tables is referring to or is referred by the directly associated table. Considering a situation, where table A is a query table and table B is referring to table A. Further, table C is referring to table B and table D is referring to table C. In such a situation, table B is said to be directly associated table, while, table C and table D are said to be indirectly associated tables.

In an implementation, the key value list for the query table is created by executing the filter query applied on the query table and retrieving primary key values from resulting rows obtained upon the execution of the filter query. The primary key values are the values in a primary key of a table, which uniquely identifies each record in the table. Considering a case where a filter query: Select * from employee where employee name !=ram, is applied on an employee table. In such a case, the key value list for the employee table is created by executing the above mentioned filter query to obtain a plurality of rows from the employee table satisfying the condition 'employee name !=ram' as specified in the filter query. The condition here indicates that one or more rows containing employee name 'ram' is to be skipped and remaining rows in the employee table is to be extracted as a result of the execution of the filter query. Further out of the resulting rows, values in the primary key column of each row are to be selected and stored in a key value list.

In said implementation, the key value lists for the associated tables are created based on the key value lists of a corresponding parent table of the associated tables. A parent table may be understood as a table having one or more other tables referring to it. For example, if a key value list for a query table, say, table A is created, then a key value list for a table B that is referring to table A is created based on the key value list of table A. Further, a key value list for a table C that is referring to table B is created based on the key value list of table B.

In an implementation, once a leaf table is encountered during the top-to-bottom iteration, the bottom-to-top iteration is initiated. A leaf table may be understood as a table that does not have any child table referring to it, or in other words a leaf table is a table that is not referred by any other table in the production database. Such leaf table is placed, for example, lowest in the order list.

During bottom-to-top iteration, the tables in the production database are traversed in an order that is reverse to the order indicated in the order list. This order, reverse to the order indicated in the order list, may be referred to as reverse order. For example, when the order indicated by the order list is parent first-child next order, the corresponding reverse order may be child first-parent next order. While traversal, for each table, a determination is made whether the table is referred by some other table indicated in the order list. If the result of the determination yields that the table is not referred by any other table, i.e., the table is a leaf table, sample data from the table is extracted based on the sampling percentage specified by the user in the filtering criteria. In an implementation, if the user has not specified the sampling percentage in the filtering criteria, by default all the values in the tables are extracted as the sample data. On the other hand, if the determination yields that the table is referred by one or more other tables, the corresponding key value list for such table is retrieved and the sample data is extracted based on values indicated in the key value list. Likewise, the sample data from each of the query tables and associated tables is extracted during the bottom-to-top traversal. As indicated previously, the sample data extracted from the each table may be stored in form of a sample file or a sample table.

In an implementation, the extracted sample data is loaded onto a test database, where the sample data may be used as test data for testing purposes. In said implementation, the test database has similar structure as of the production database. Subsequent to loading the sample data, various integrity constraints that are present in the production database are created in the test database, in order to ensure that the test database corresponds to the semantics of the original production database.

Figure 1:
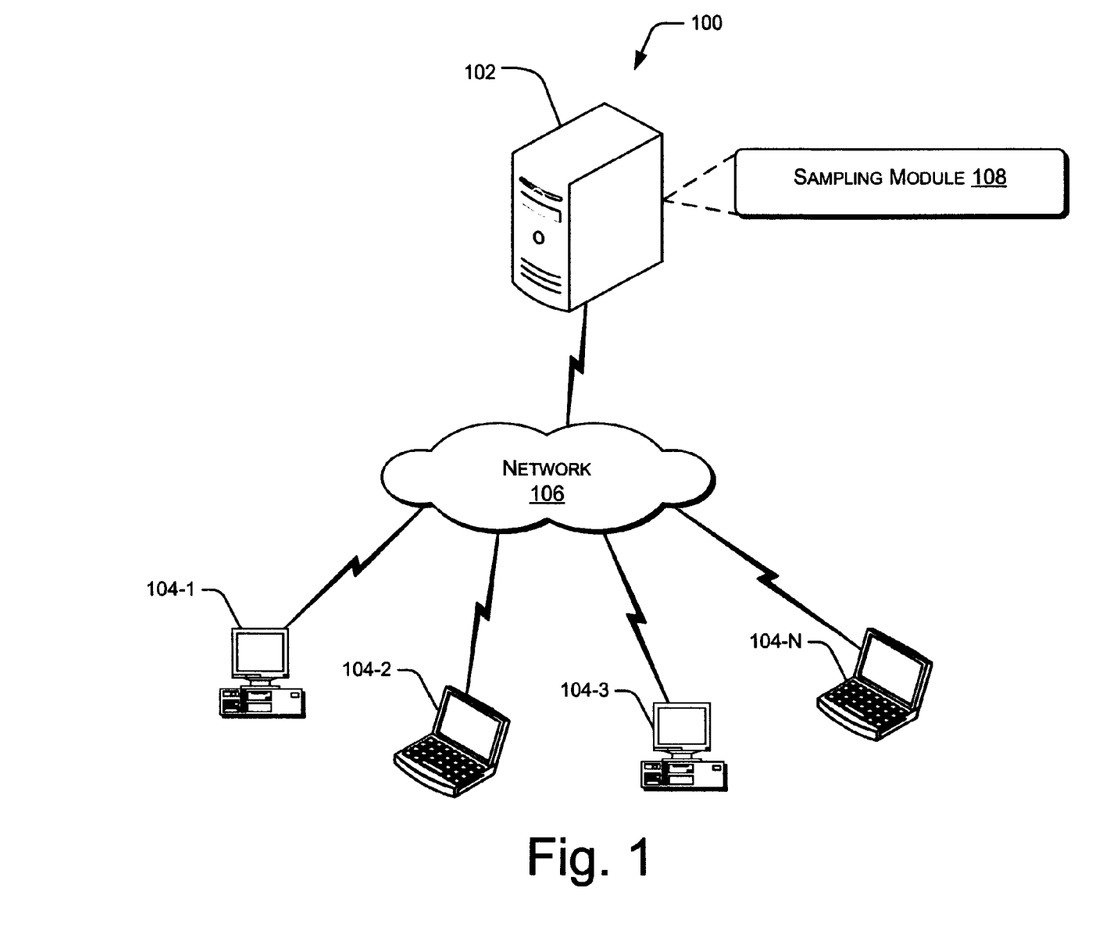
FIG. 1 illustrates a network environment implementing a database sampling system, in accordance with an embodiment of the present subject matter.
Figure 2A:
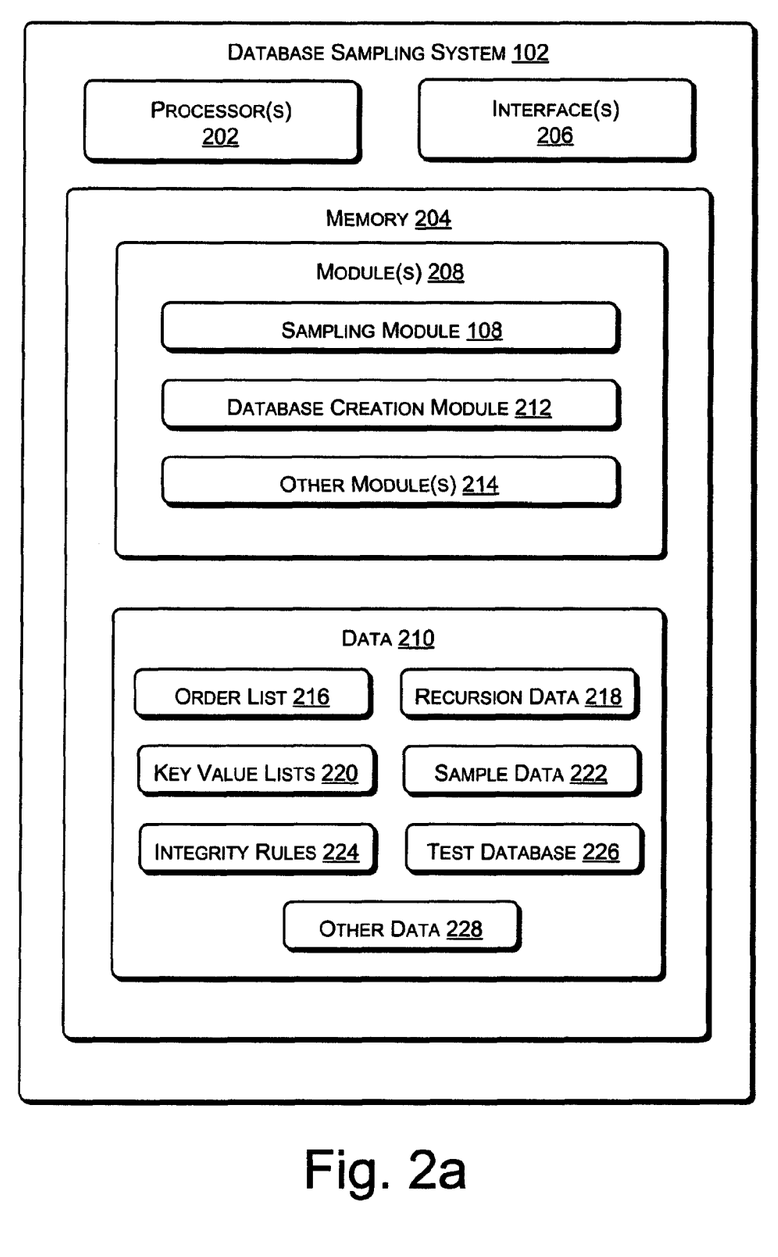
FIG. 2a illustrates components of the database sampling system, in accordance with an embodiment of the present subject matter.
Figure 2B:
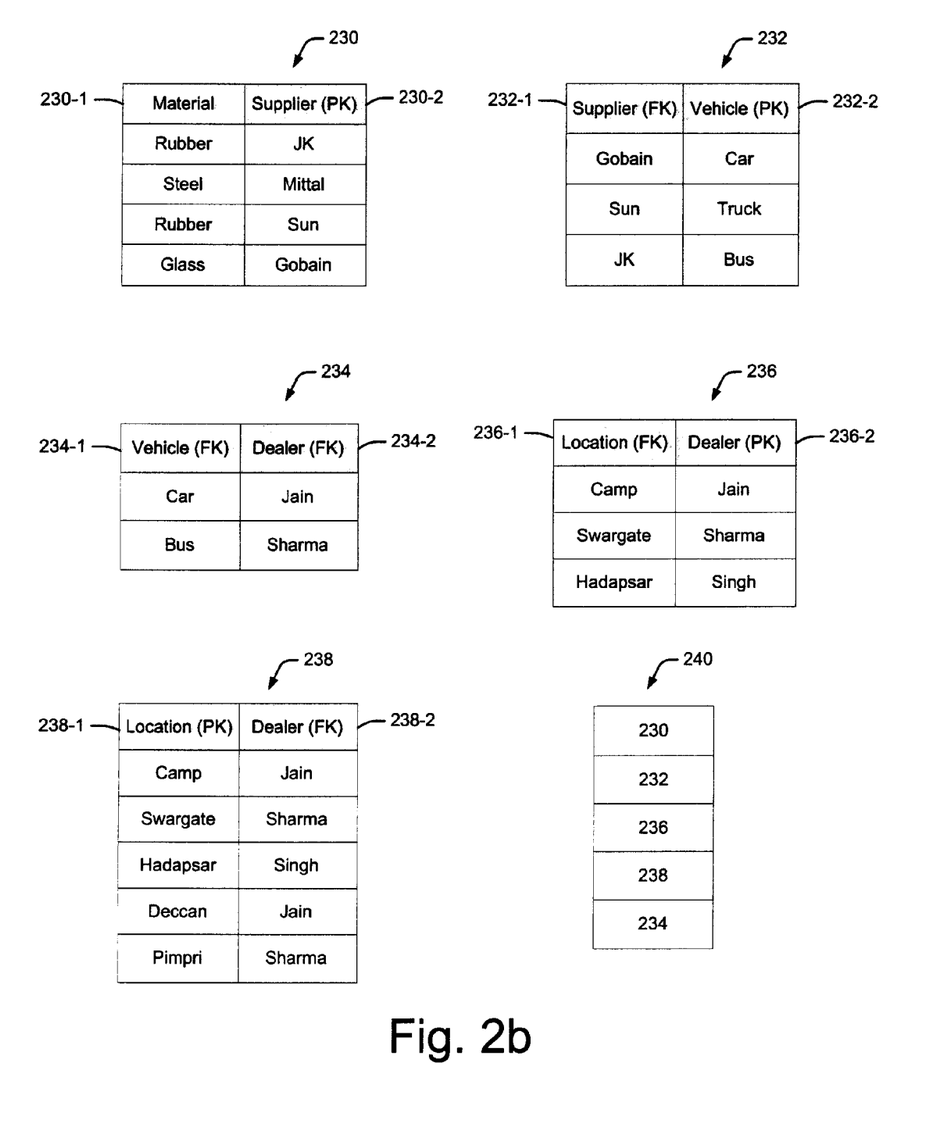
FIG. 2b illustrates tables in a production database and an order list, in accordance with an embodiment of the present subject matter.
Figure 2C:
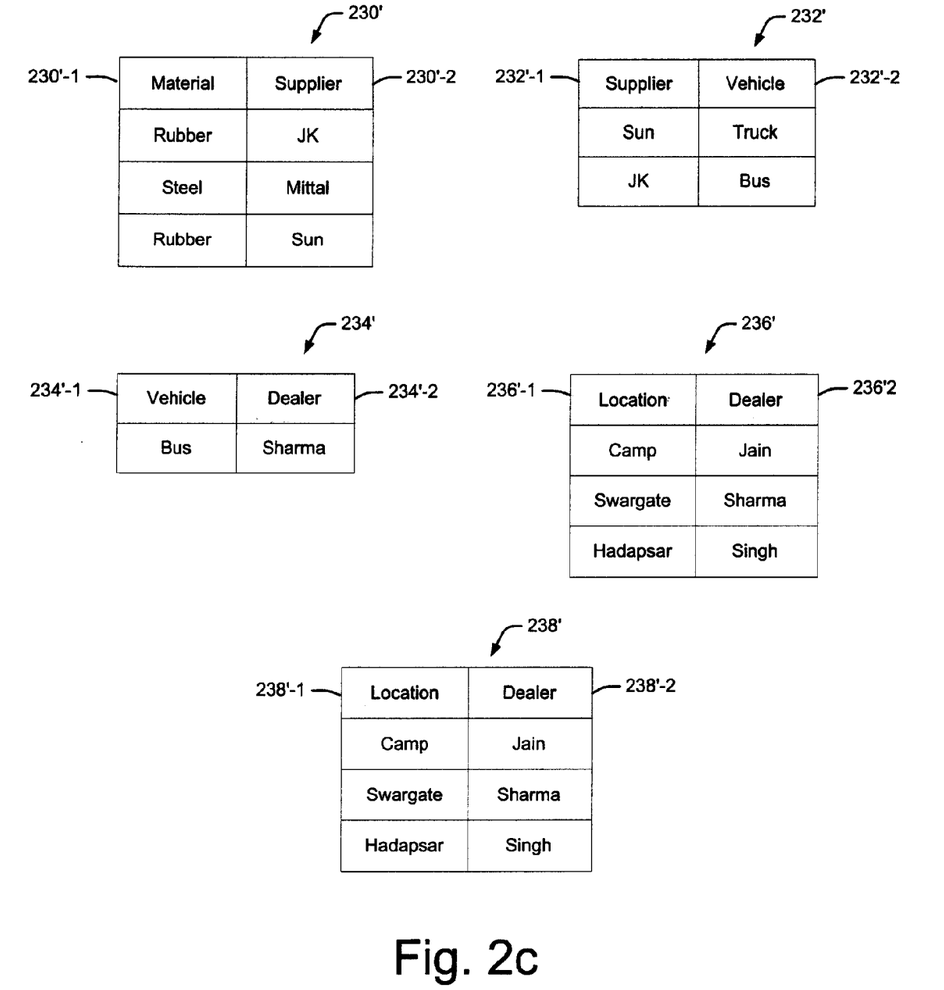
FIG. 2c illustrates sample tables, in accordance with an embodiment of the present subject matter.
Figure 3:
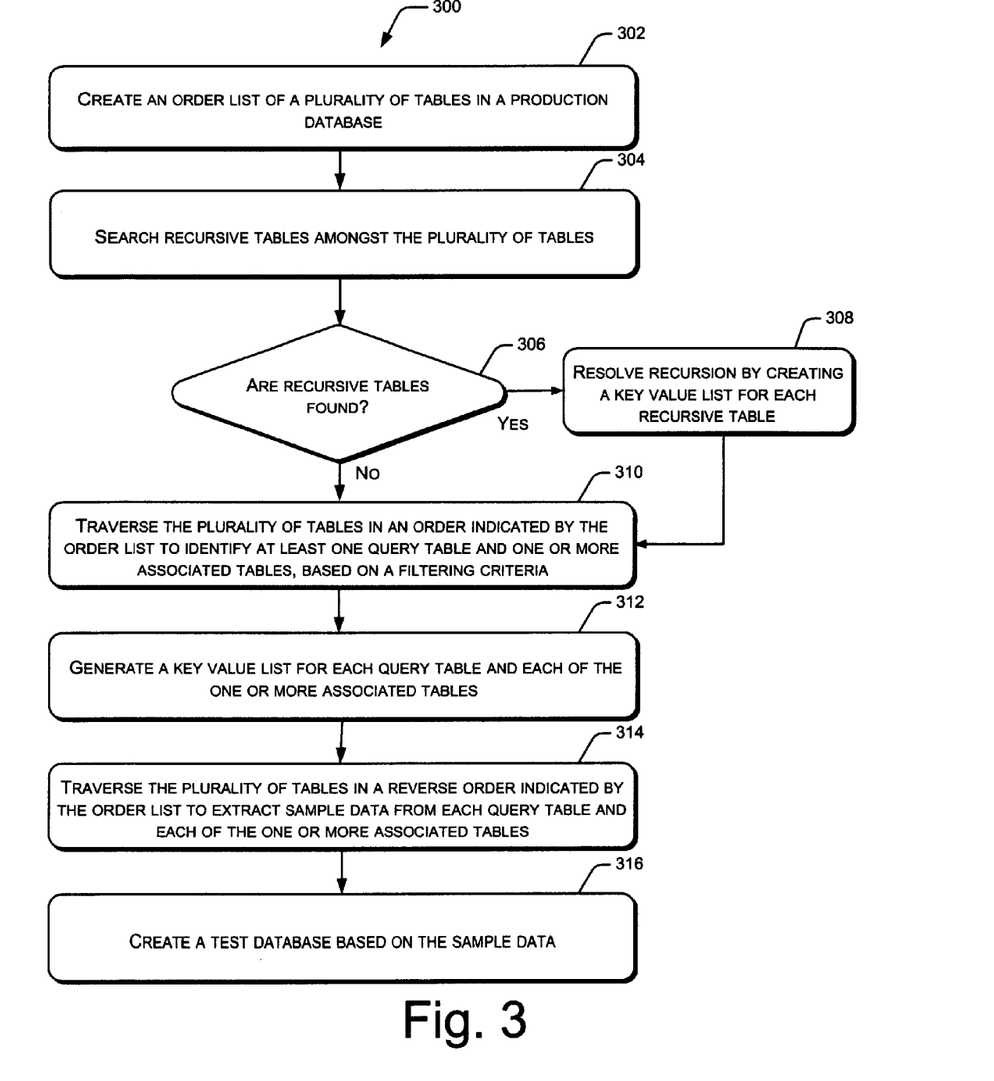
FIG. 3 illustrates a method for database sampling, in accordance with an embodiment of the present subject matter.

The manner in which database sampling is carried out is explained further in conjunction with FIGS. 1 to 3. While aspects of systems and methods may be implemented in any number of different computing systems, environments, and/or configurations, the embodiments are described in the context of the following exemplary system architecture(s).

FIG. 1 illustrates a network environment 100 implementing a database sampling system 102, in accordance with an embodiment of the present subject matter. In one implementation, the network environment 100 can be a company network, including thousands of office personal computers, laptops, various servers, such as blade servers, and other computing devices connected over a network 106. In another implementation, the network environment 100 can be a home network with a limited number of personal computers and laptops connected over the network 106.

The database sampling system 102 is connected to a plurality of user devices 104-1, 104-2, 104-3, ... 104-N, collectively referred to as the user devices 104 and individually referred to as a user device 104. The database sampling system 102 and the user devices 104 may be implemented as any of a variety of conventional computing devices, including, for example, servers, a desktop PC, a notebook or portable computer, a workstation, a mainframe computer, and an internet appliance. The database sampling system 102 is connected to the user devices 104 over the network 106 through one or more communication links.

The network 106 may be a wireless network, a wired network, or a combination thereof. The network 106 can also be an individual network or a collection of many such individual networks, interconnected with each other and functioning as a single large network, e.g., the Internet or an intranet. The network 106 can be implemented as one of the different types of networks, such as intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other.

The users, such as database analyst, database administrators, and SQL programmers may interact through the user devices 104 with the database sampling system 102 for creating a sampled database or test database that can be used for testing purposes.

The database sampling system 102, according to an implementation of the present subject matter, creates a test database that is semantically correct and satisfies various integrity constraints and dependencies. For creation of the test database, the database sampling system 102 obtains a semantically correct sample data, which is portion of the production data from the production database upon receives filtering criteria from the users. The filtering criteria may be in form of one or more filter queries formulated in SQL and/or sampling percentage. The examples of filter query includes, but not limited to, simple 'Select' query formulated in SQL for selecting the required portion of data from the production database, for testing an application. The sampling percentage indicates percentage of production data required for testing an application. The sampling percentage may vary from 1% to 100%. In an implementation, a default sampling percentage, for example, 100% is preset in the database sampling system 102. In said implementation, the database sampling system 102 picks up default sampling percentage for database sampling, if the user has not specified the sampling percentage.

The database sampling system 102 obtains the sample data, based on the filtering criteria. If the filtering criteria include one or more filter queries, the database sampling system 102 obtains sample data, based on the filter queries. While, if the filtering criteria includes one or more filter queries and sampling percentage, the database sampling system 102 obtains the sample data, based on the filter queries and the sampling percentage. On the other hand, if the filtering criteria include sampling percentage, the database sampling system 102 obtains the sample data, based on the sampling percentage.

In one implementation, the database sampling system 102 comprises a sampling module 108 that receives the filtering criteria. Subsequent to receiving the filtering criteria, the sampling module 108 creates an order list of a plurality of tables in a production database by listing the tables, for example, in parent first-child next manner, i.e., the parent tables are listed higher in the order list than the child tables. A parent table may be understood as a table that is being referred by one or more other tables in a database, and a child table may be understood as a table that is referring to one or more tables in the database.

Once the order list is created, the sampling module 108 traverses the plurality of tables in the production database to identify one or more recursive tables from the plurality of tables. The recursive tables may be understood as the tables having cyclic dependencies between one another, i.e., tables are dependent on one another. For example, if table A is dependent on table B and table B is dependent on table A, i.e. table A and table B are dependent on one another, such tables are referred as recursive tables. Upon traversal, if one or more recursive tables are found, the sampling module 108 resolves recursion between those tables.

For resolving recursion, the sampling module 108 creates a key value list for each recursive table, for example, by selecting distinct foreign key values for each recursive table from its corresponding dependent table. For example, if table A and table B are recursive tables that are referring to one another, the key value list for table A is created by selecting distinct foreign key values from table B, and the key value list for table B is created by selecting distinct foreign key values from table A. By doing so, the sampling module 108 reaches to a common set of values lying in both the tables, thereby resolving the cyclic dependencies between the recursive tables.

Subsequent to creation of the order list and resolving recursion, the sampling module 108 samples the production database to create a test database. The sampling module 108 carries out the sampling process in two iterations, namely, a top-to-bottom iteration and a bottom-to-top iteration. During the top-to-bottom iteration, the sampling module 108 traverse the tables in the production database in an order indicated by the order list, for example, in the parent first-child next order. While traversing, the sampling module 108 identifies one or more query tables and associated tables from among the plurality of tables in the production database, and creates a key value list for each of the one or more query tables and associated tables. A query table may be understood as a table on which filtering criteria, such as the filter query has been applied and an associated table may be understood as a table that is related to the query table either directly or indirectly.

In an implementation, for creating the key value list for the query table, the sampling module 108 executes the filter query and selects primary key values from a result obtained by the execution of the filter query. The sampling module 108 stores such selected primary key values in form of a key value list. Further, the key value lists for the associated tables are created, based on the key value lists of its corresponding parent table. In an example, if a table has the query table as its parent table, the key value list for such table is created based on the key value list of the query table.

In an implementation, once a leaf table is encountered during traversing the tables in the top-to-bottom iteration, the bottom-to-top iteration is initiated. The leaf table is a table in the production database that is not referred by any other table. Upon initialization of the bottom-to-top iteration, the sampling module 108 starts traversing the tables in the production database in an order that is reverse to the order indicated by the order list, say, in child first-parent next manner. While traversal, the sampling module 108 extracts sample data from the tables based on the corresponding key value list and/or the filtering criteria. For example, if the leaf table is encountered during traversal, sample data from the leaf table is extracted based on the sampling percentage specified by the user in the filtering criteria. In case the user has not specified the sampling percentage in the filtering criteria, the sampling module 108 extract the sample data from the leaf table based on a default sampling value pre-set in the database sampling system 102. The default sampling percentage value is, for example, 100%, which means that all the values in the leaf table are extracted as sample data. Likewise, sample data from each query table and associated table is extracted.

In an implementation, the extracted sample data is loaded onto a test database, where the sample data can be utilized as test data for testing purposes. The test database referred herein may have same structure as the production database. The database sampling system 102 in accordance with the present subject matter creates various integrity constraints and/or dependencies in the test database based on the integrity constraints and dependencies in the production database.

FIG. 2a illustrates components of the database sampling system 102, according to an embodiment of the present subject matter. In said embodiment, the database sampling system 102 (hereinafter referred to as the system 102) includes one or more processor(s) 202, a memory 204 coupled to the processor 202, and interface(s) 206.

The processor 202 can be a single processing unit or a number of units, all of which could include multiple computing units. The processor 202 may be implemented as one or more microprocessors, microcomputers, microcontrollers, digital signal processors, central processing units, state machines, logic circuitries, and/or any devices that manipulate signals based on operational instructions. Among other capabilities, the processor 202 is configured to fetch and execute computer-readable instructions and data stored in the memory 204.

The interfaces 206 may include a variety of software and hardware interfaces, for example, interface for peripheral device(s) such as a keyboard, a mouse, an external memory, a printer, etc. Further, the interfaces 206 may enable the system 102 to communicate with other computing devices, such as web servers and external databases. The interfaces 206 may facilitate multiple communications within a wide variety of protocols and networks, such as a network, including wired networks, e.g., LAN, cable, etc., and wireless networks, e.g., WLAN, cellular, satellite, etc.

The memory 204 may include any computer-readable medium known in the art including, for example, volatile memory such as static random access memory (SRAM) and dynamic random access memory (DRAM), and/or non-volatile memory, such as read only memory (ROM), erasable programmable ROM, flash memories, hard disks, optical disks, and magnetic tapes. The memory 204 also includes module(s) 208 and data 210.

The modules 208 include routines, programs, objects, components, data structures, etc., which perform particular tasks or implement particular abstract data types. In one implementation, the modules 208 include the sampling module 108, a database creation module 212, and other module(s) 214. The other module(s) 214 may include programs or coded instructions that supplement applications and functions, for example, programs in the operating system of the system 102.

The data 210, amongst other things, serves as a repository for storing data processed, received, and generated by one or more of the module(s) 208. The data 210 includes order list 216, recursion data 218, key value lists 220, sample data 222, integrity rules 224, test database 226, and other data 228. The other data 228 includes data generated as a result of the execution of one or more modules in the other modules 214.

As mentioned previously, the system 102, in accordance with the present subject matter receives filtering criteria from users, such as database analysts, database administrators, and SQL programmers. Further, the system 102 extracts sample data from a plurality of tables in the production data, based on the filtering criteria, and create the test database based on the sample data. The manner in which the sample data is extracted and the test database is created is explained in detail in the following sections, viz, database sampling and creation of test database.

Database Sampling

The sampling module 108 receives filtering criteria from the users in order to select and extract the required portion of data (sample data) from the production database. As indicated previously, the filtering criteria may be in form of one or more filter queries formulated in SQL. Further, a sampling percentage may also form part of the filtering criteria. The sampling module 108 extracts the sample data from the production database based on the filtering criteria. If the filtering criteria include one or more filter queries, the sampling module 108 extracts the sample data, based on the filter queries. While, if the filtering criteria include one or more filter queries and sampling percentage, the sampling module 108 extracts the sample data, based on the filter queries and the sampling percentage. On the other hand, if the filtering criteria include sampling percentage, the sampling module 108 extracts the sample data, based on the sampling percentage.

Subsequent to receiving the filtering criteria, the sampling module 108 creates an order list of a plurality of tables in a production database by listing the tables, for example, in parent first-child next manner. Such order list may be stored as the order list 216. In a parent first-child next manner the parent tables are listed higher in the order list than the child tables.

Once the order list is created, the sampling module 108 traverses die plurality of tables in the production database, based on the order list to identify one or more recursive tables among the plurality of tables in the production database. Upon traversal, if one or more recursive tables are found, the sampling module 108 resolves recursion between those tables. For resolving recursion, the sampling module 108 creates a key value list for each recursive table.

In one implementation, in order to create the key value list for each recursive table the sampling module 108 formulates and executes a simple 'Select' SOL query for selecting distinct foreign key values for the recursive table from the another recursive table.

Exemplary tables in the production database and an exemplary order list for such tables is illustrated in FIG. 2b.

In FIG. 2b, the plurality of tables include a material-supplier table 230, a supplier-vehicle table 232, a vehicle-dealer table 234, a first location-dealer table 236, and a second location-dealer table 238. In the material-supplier table 230, the supplier 230-2 is a primary key (PK). In the supplier-vehicle table 232, supplier 232-1 is a foreign key (FK) that refers to its primary key supplier 230-2 of the material-supplier table 230, and vehicle 232-2 is a primary key. In the vehicle-dealer table 234, vehicle 234-1 is a foreign key that refers to its primary key vehicle 232-2 of the supplier-vehicle table 232, and the dealer 234-2 is also a foreign key that refers to its primary key dealer 236-2 of the location-dealer table 236. In addition to the dealer 236-2, the location-dealer table 236 includes location 236-1, which is a foreign key referring to its primary key location 238-1 of the location-dealer table 238. The location-dealer table 238 further includes dealer 238-2 in addition to the location 238-1, which is a foreign key referring to its primary key dealer 236-2.

In said example, the sampling module 108 identifies the material-supplier table 230 as the parent table of the supplier-vehicle table 232, the supplier-vehicle table 232 as the child table of the material-supplier table 230 and the parent table of the vehicle-dealer table 234, the vehicle-dealer table 234 as child table of the supplier-vehicle table 232 and also the child table of the location-dealer table 236. Further, the sampling module 108 identifies the location-dealer table 236 as the parent of the vehicle-dealer table 234 and also the parent as well as the child of the location-dealer table 238, and the location-dealer table 238 as the parent as well as the child of the location-dealer table 236.

Accordingly, the sampling module 108 creates an order list 240 as indicated. As illustrated, the various tables are listed in parent first-child next order. Thus, the tables are included in the following order the material-supplier table 230, the supplier-vehicle table 232, the location-dealer table 236, the location-dealer table 238, and the vehicle-dealer table 234.

Subsequent to creation of the order list 240, the sampling module 108 identifies the location-dealer table 236, and the location-dealer table 238 as recursive tables, as the location-dealer table 236 is dependent on the location-dealer table 238, and the location-dealer table 238 is dependent on the location-dealer table 236. Upon identification of the recursive tables, the sampling module resolves recursion between the tables location-dealer table 236 and the location-dealer table 233 by creating the key value list, such as, 238_Location.Key containing values 'Camp, Swargate. Hadapsar' for the location-dealer table 236, and the key value list 236_Dealer.Key containing values 'Jain, Sharma, Singh' for the location-dealer table 238.

Subsequent to creation of the order list and resolution of recursion, the sampling module 108 obtains sample data from the production database. For obtaining the sample data, the sampling module 108 performs two iterations, for example, a top-to-bottom iteration, and a bottom-to-top iteration explained in detail in the following sub-sections, viz, top-to-bottom iteration and bottom-to-top iteration.

Top-to-Bottom Iteration

During the top-to-bottom iteration, the sampling module 108 traverses the tables in the production database in an order indicated by the order list, say, in the parent first-child next order. While traversal, the sampling module 108 creates a key value list for the query tables and the tables that are associated with the query tables either directly or indirectly.

In an implementation, the sampling module 108 creates the key value list for the query table, by executing the filter query and selecting primary key values from a result obtained by the execution of the filter query. The sampling module 108 stores such selected primary key values in form of the key value list in a repository, namely, the key value lists 220. In said implementation, the sampling module 108 creates the key value list for each associated table in an order as indicated in the order list, based on the key value list of their corresponding parent table. The sampling module 108 subsequently stores the key value lists created for the associated tables in the key value lists 220.

Referring to the tables illustrated in FIG. 2b, if a filter query Select * from material-supplier where material !='glass' is specified by the user, the sample module 108 traverses the tables 230, 232, 234, 236, and 238 in the production database in an order as indicated by the order list 240, i.e. table 230, followed by table 232, then table 236, and then table 238, and finally table 234. Upon traversing, the sampling module 108 initiates the creation of a key value list for the query table), which is the material-supplier table 230. The sampling module 108 creates the key value list, namely, 230_supplier.key containing values 'JK, Mittal, Sun' for the material-supplier table 230 based on the filter query Select * from material-supplier where material !='glass' according to which all the rows from the material-supplier table 230 is to be selected, except the row having glass as the material.

The tables 230, 232, 234, 236, and 238 are further traversed in the order specified by the order list 240 to create the key value lists for the tables that are associated to the query table, i.e., the material-supplier table 230. The associated tables are tables 232, 236, 238, and 234. The sampling module 108 creates the key value list for each of such associated tables based on the key value list of its corresponding parent table. The sampling module 108 creates the key value lists for the associated tables in the order indicated by the order list 240. Therefore, the sampling module 108 creates the key value list, namely, 232_vehicle.key containing values 'Truck, Bus'.

As indicated previously, during top-to-bottom iteration, if a leaf table is encountered next in the traversal, the bottom-to-top iteration is initiated.

Bottom-to-Top Iteration

During the bottom-to-top iteration, the sampling module 108 traverses the tables in the production database in an order that is reverse to the order indicated by the order list, say, in child first-parent next manner. While traversal, the sampling module 108 extracts sample data form each of the query tables and the associated tables based on the corresponding key value list and/or the filtering criteria. In an implementation, if the leaf table is encountered during traversal of the tables in bottom-to-top iteration, sample data from the leaf table is extracted based on the sampling percentage specified by the user in the filtering criteria. There may be instances that the users do not specify the sampling percentage, in such instances, the sampling module 108 extracts sample data form the leaf table based on a default sampling percentage pre-set in the sampling module 108.

In an example, if 25% is specified as sampling percentage, one fourth of the production data from the leaf table is extracted as the sample data. In yet another example, if 100% is specified as the sampling percentage or if no sampling percentage is specified by the user, the database sampling system 102 extracts entire production data as the sample data from the leaf table. The sample data is thereafter stored in the sample data 222. It is to be understood that sample data extracted from each of the query tables and the associated tables can be stored in the sample data 222.

Referring to the tables illustrated in FIG. 2c, during the bottom-to-top iteration, the tables in the production database are traversed in an order that is reverse to the order indicated by the order list 240, i.e., table 234, followed by table 238, then table 236, and then table 232, and finally table 230. While traversal, the sampling module 108 extracts sample data for tables, based on the corresponding key value lists, if the key value lists exist for the tables. In case, if the key value lists does not exist for the tables, for example, in case of a leaf node that is not referred by any other table, the key value list is not created. For such tables, the sample data is extracted based on the sampling percentage specified by the user in the filtering criteria or a default sampling percentage, if the sampling percentage is not specified by the user. The sample data may be for example, in form of sample tables.

Therefore in FIG. 2c, a sample vehicle-dealer table 234' is created for the vehicle-dealer table 234, based on the sampling percentage, assuming that the sampling percentage specified by the user is 50%. Upon traversing next table in the reverse order, a sample location-dealer table 238' is created, based on the key value list of the location-dealer table 238. Further, a sample location-dealer table 236' is created based on the location-dealer table 236, and a sample supplier-vehicle table 232' is created based on the supplier-vehicle table 232. Furthermore, a sample material-supplier table 230' is created based on the material-supplier table 230.

Creation of Sampled Database

Subsequent to extracting the sample data from each of the query tables and the associated tables, the sample data stored in the sample data 222 is retrieved and loaded onto the test database 226. The test database 226 may have, for example, a structure similar to a structure of the production database. In operation, the database creation module 212 retrieves the sample data from the sample data 222, and loads such sample data into the test database 226.

Once the test database 226 is loaded, the database creation module 212 creates various integrity constraints and/or dependencies in the tables of the test database 226 by referring to the integrity constraints and dependencies of the production database. In one implementation, the database creation module 212 obtains information related to various integrity constraints and dependencies existing in the production database and formulates a plurality of integrity rules, which may be stored in the integrity rules 224. Based on such integrity rules, the database creation module 212 creates similar integrity constraints and dependencies as of the production database, thereby ensuring that the test database 226 corresponds to the semantics of the production database.

FIG. 3 illustrates a method 300 for database sampling, in accordance with an embodiment of the present subject matter. The exemplary method may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices.

The order in which the methods are described is not intended to be construed as a limitation, and any number of the described method blocks can be combined in any order to implement the methods, or alternative methods. Additionally, individual blocks may be deleted from the methods without departing from the spirit and scope of the subject matter described herein. Furthermore, the methods can be implemented in any suitable hardware, software, firmware, or combination thereof.

The method 300 may be implemented on a database sampling system, such as the database sampling system 102. At block 302, an order list is created for a plurality of tables in a production database. In an implementation, the order list for such tables is created, for example, by listing table names of the plurality of tables in a parent first-child next order, i.e., the parent tables are listed higher in the order than the child tables. In one example, the sampling module 108 creates such an order list. The sampling module 108 stores the order list in the order list 216.

At block 304, one or more recursive tables amongst the plurality of tables are searched. In one example, the sampling module 108 search for the tables having recursive association between them, from among the plurality of tables in the production database. The recursive association may be, for example, a cyclic dependency between the tables.

At block 306, a determination is made whether any recursive tables are found or not. If the determination yields that one or more recursive tables are found ('Yes' branch from block 306), a recursive association or recursion between the recursive tables is resolved by creating a key value list for each recursive table at block 308. The key value list for a table may be understood as a set of unique values for a key column, such as a primary key column or a foreign key column of the table. In one example, the sampling module 108 resolves recursion by creating the key value list for each recursive table. For creating such key value list, the sampling module 108 formulates and execute a simple 'Select' SOL query for selecting distinct foreign key values for the recursive table from the other recursive table, on which the recursive table is dependent.

On the other hand, if the determination yields that no recursive table is found ('No' branch from block 308), the method 300 proceeds to block 310. At block 310, the tables in the production database are traversed in an order, for example, the parent first-child next order indicated by the order list to identify at least one query table and one or more associated tables. In other words, the tables indicated by the order list are traversed from top-to-bottom (also referred as top-to-bottom iteration). While traversing, at least one query table, i.e., the table on which a filtering criteria, such as a filter query has been applied by a user, and the tables that are associated with the query tables either directly or indirectly, for example, the tables that are referred by or referring to the filter query are identified. The filtering criteria referred herein may includes one or more filter queries formulated in SQL, and/or sampling percentage indicative of percentage of the production data to be extracted. In one example, the sampling module 108 identifies the query table and one or more associated tables, based on the filtering criteria.

At block 312, a key value list for each of the identified query table and the associated tables is generated. In one implementation, the key value list for the query table and the associated tables are created, if the key value list for any of the query table and the associated tables have not been created previously. In case, the key value list for any of the query tables and the associated tables has already been created, such table is skipped and no key value list is created for such table. In one example, the key value list for each of the query table and the table is generated during the traversal. Therefore, the order of generation of such key value list is same as the order of the traversal.

In one implementation, the sampling module 108 generates the key value list. For generating the key value list for the query table, the sampling module 108 executes the filter query specified in the filtering criteria and extracts the primary key values from a result obtained by the execution of the filter query, in one implementation. The sampling module 108 stores the extracted primary key values in form of the key value list in the key value lists 220. In said implementation, the sampling module 108 creates key value lists for the associated tables in an order as indicated in the order list, based on the key value list of its corresponding parent table. The sampling module 108 subsequently stores the key value lists created for the associated tables in the key value lists 220. When a leaf table is encountered during traversal, the process of creation of the key value lists is completed and the method 300 proceeds to block 314.

At block 314, the plurality of tables indicated by the order list is traversed in a reverse order, for example, in child first-parent next order, in the production database. In other words, the tables indicated in the order list are traversed in bottom-to-top manner (also referred as bottom-to-top iteration). During traversal, sample data from each of the query tables and the associated tables is extracted based on the generated key value list and/or filtering criteria. In one implementation, the sampling module 108 extracts such sample data. For creating the sample data, the sampling module 108 determines whether the table is a leaf table, i.e., is the table not referred by other tables in the production database. If the result of the determination yields that the table is a leaf table, the sampling module 108 extracts sample data from the leaf table based on the sampling percentage specified by the user. In case, the user has not specified the sampling percentage, the sampling module 108 extracts all the values from the leaf table as the sample data. On the other hand, if the determination yields that the table is not the leaf table, the sampling module 108 extracts the sample data from the table, based on the key value list of a corresponding parent table. The sampling module 108 stores the extracted sample data in the sample data 222.

At block 316, a test database is created based on the sample data. In an example, the database creation module 212 retrieves the sample data from the sample data 222, and loads such sample data in the test database 226. The test database 226 may have, for example, a structure similar to a structure of the production database.

Subsequent to loading the sample database, the database creation module 212 creates various integrity constraints and/or dependencies in the test database 226 based on the integrity constraints and dependencies of the production database. In one implementation, the database creation module 212 obtains information related to various integrity constraints and dependencies in the production database and formulates integrity rules. In said implementation, based on the integrity rules, the database creation module 212 creates similar integrity constraints and dependencies as of the production database, in the test database 226, thereby ensuring that the test database 226 corresponds to the semantics of the production database.

Although embodiments for sampling of database have been described in language specific to structural features and/or methods, it is to be understood that the invention is not necessarily limited to the specific features or methods described. Rather, the specific features and methods are disclosed as exemplary implementations for the sampling of database.

We claim:

1. A method for database sampling, the method comprising:
identifying at least one query table and one or more associated tables amongst a plurality of tables in a production database, wherein the one or more associated tables are related to the at least one query table;
generating a key value list for the at least one query table and each of the one or more associated tables, based on an order indicated by an order list, wherein the generating the key value list comprises deriving a set of values from key columns of the at least one query table and the one or more associated tables by:
executing a filtering criteria on the at least one query table and the one or more associated tables,
based on the execution of the filtering criteria on the at least one query table, obtaining primary key values for the at least one query table to provide a key value list for the query table, and
obtaining a key value list for the one or more associated tables based on the key value list for the query table; and
extracting sample data in a reverse order indicated by the order list from the at least one query table and each of the one or more associated tables, based on the generated key value list.

2. The method as claimed in claim 1 further comprising:
loading the sample data in a test database; and
creating integrity constraints in the test database.

3. The method as claimed in claim 1, wherein the order list comprises a table name of each of the plurality of tables listed in a parent first-child next manner.

4. The method as claimed in claim 1, wherein the filtering criteria comprises at least a filter query.

5. The method as claimed in claim 1, wherein the generating the key value list for the at least one query table is further based on the filtering criteria, and the generating the key value list for each of the one or more associated tables is further based on the key value list of a corresponding parent table of each of the one or more associated tables.

6. The method as claimed in claim 1 further comprising:
determining one or more recursive tables amongst the plurality of tables, wherein the recursive tables are tables that are cyclically dependent on one another; and
creating a key value list for each of the one or more recursive tables, by obtaining distinct foreign key values from each of the one or more recursive tables.

7. The method as claimed in claim 1, wherein the extracting is initiated at occurrence of a leaf table.

8. The method as claimed in claim 1, wherein the extracting further comprises retrieving the sample data from a leaf table based on the filtering criteria.

9. A database sampling system comprising:
a processor; and
a memory coupled to the processor, the memory comprising:
a sampling module configured to,
identify at least one query table and one or more associated tables amongst a plurality of tables in a production database;
generate a key value list for the at least one query table and each of the one or more associated tables, in a parent first-child next order, wherein the key value list is a list of set of values that are derived from key columns of the at least one query table and the one or more associated tables by:
- executing a filtering criteria on the at least one query table and the one or more associated tables,
- based on the execution of the filtering criteria on the at least one query table, obtaining primary key values for the at least one query table to provide a key value list for the query table, and
- obtaining a key value list for the one or more associated tables based on the key value list for the query table; and extract sample data in a child first-parent next order from the at least one query table and each of the one or more associated tables, based on the generated key value list.

10. The database sampling system as claimed in claim 9, further comprises a database creation module configured to,
- load the sample data in a test database; and
- create integrity constraints in the test database.

11. The database sampling system as claimed in claim 9, wherein the sampling module generate the key value list for the at least one query table based on the filtering criteria, and generate the key value list for each of the one or more associated tables based on the key value list of a corresponding parent table of each of the one or more associated tables.

12. A non-transitory computer-readable medium having embodied thereon a computer program for executing a method comprising:
- identifying at least one query table and one or more associated tables amongst a plurality of tables in a production database;
- generating a key value list for the at least one query table and each of the one or more associated tables based on an order indicated by an order list, wherein the generating the key value list comprises deriving a set of values from key columns of the at least one query table and the one or more associated tables by
  - executing a filtering criteria on the at least one query table and the one or more associated tables;
  - based on the execution of the filtering criteria on the at least one query table, obtaining primary key values for the at least one query table to provide a key value list for the query table; and
  - obtaining a key value list for the one or more associated tables based on the key value list for the query table; and
- extracting sample data in a reverse order indicated by the order list from the at least one query table and each of the one or more associated tables, based on the generated key value list.

13. The non-transitory computer-readable medium as claimed in claim 12 further comprising:
- loading the sample data in a test database; and
- creating integrity constraints in the test database.

14. The non-transitory computer-readable medium as claimed in claim 12, wherein the order list comprises a table name of each of the plurality of tables listed in a parent first-child next manner.

15. The non-transitory computer-readable medium as claimed in claim 12, wherein the filtering criteria comprises at least a filter query.

16. The non-transitory computer-readable medium as claimed in claim 12, wherein the generating the key value list for the at least one query table is further based on the filtering criteria, and the generating the key value list for each of the one or more associated tables is further based on the key value list of a corresponding parent table of each of the one or more associated tables.

17. The non-transitory computer-readable medium as claimed in claim 12 further comprising:
- determining one or more recursive tables amongst the plurality of tables, wherein the recursive tables are tables that are cyclically dependent on one another; and
- creating a key value list for each of the one or more recursive tables, by obtaining distinct foreign key values from each of the one or more recursive tables.

18. The non-transitory computer-readable medium as claimed in claim 12, wherein the extracting is initiated at occurrence of a leaf table.

19. The non-transitory computer-readable medium as claimed in claim 12, wherein extracting further comprises retrieving the sample data from a leaf table based on filtering criteria.

* * * * *